(12) United States Patent
Kim et al.

(10) Patent No.: US 11,457,458 B2
(45) Date of Patent: Sep. 27, 2022

(54) DYNAMIC BANDWIDTH ADAPTATION WITH NETWORK SCHEDULING

(71) Applicant: Apple Inc., Cupertino, CA (US)

(72) Inventors: Yuchul Kim, Santa Clara, CA (US); Jia Tang, San Jose, CA (US); Yang Li, Plano, TX (US); Wei Zeng, San Diego, CA (US); Haitong Sun, Irving, TX (US); Yu Zhang, Beijing (CN); Zhu Ji, San Jose, CA (US); Dawei Zhang, Saratoga, CA (US)

(73) Assignee: Apple Inc., Cupertino, CA (US)

(*) Notice: Subject to any disclaimer, the term of this patent is extended or adjusted under 35 U.S.C. 154(b) by 357 days.

(21) Appl. No.: 16/739,916

(22) Filed: Jan. 10, 2020

(65) Prior Publication Data

US 2020/0252949 A1    Aug. 6, 2020

Related U.S. Application Data

(60) Provisional application No. 62/799,431, filed on Jan. 31, 2019.

(51) Int. Cl.
*H04W 72/12* (2009.01)
*H04W 72/04* (2009.01)
(Continued)

(52) U.S. Cl.
CPC ....... *H04W 72/1215* (2013.01); *H04L 5/0053* (2013.01); *H04W 72/042* (2013.01);
(Continued)

(58) Field of Classification Search
CPC ........... H04W 72/1215; H04W 72/042; H04W 72/0446; H04W 72/0453; H04W 76/28; H04W 76/27; H04L 5/0053
See application file for complete search history.

(56) References Cited

U.S. PATENT DOCUMENTS 9,480,048 B2   10/2016   Earnshaw
10,206,134 B1   2/2019   Kocagoez
(Continued)

FOREIGN PATENT DOCUMENTS

EP          3893568  A1  * 10/2021
WO   WO 2019/013571  A1     1/2019
WO    WO-2021091179  A1  *  5/2021

OTHER PUBLICATIONS

R1-1717675, Samsung, 'On Bandwidth Part operation', Oct. 9-13, 2017, 3GPP TSG RAN WG1 NR 90bis, pp. 1-8. (Year: 2017).*
(Continued)

*Primary Examiner* — Melvin C Marcelo
(74) *Attorney, Agent, or Firm* — Kowert, Hood, Munyon, Rankin & Goetzel, P.C.

(57) ABSTRACT

This disclosure relates to techniques for a wireless device to dynamically adapt its bandwidth use using network scheduling information in a cellular communication system. A radio resource control connection between a cellular base station and a wireless device may be established. The wireless device may receive network scheduling information from the cellular base station. The wireless device may dynamically select a receive bandwidth for receiving transmissions from the cellular base station based at least in part on the network scheduling information.

20 Claims, 10 Drawing Sheets

(51) Int. Cl.
*H04L 5/00* (2006.01)
*H04W 76/28* (2018.01)
*H04W 76/27* (2018.01)

(52) U.S. Cl.
CPC ... *H04W 72/0446* (2013.01); *H04W 72/0453* (2013.01); *H04W 76/27* (2018.02); *H04W 76/28* (2018.02)

(56) References Cited

U.S. PATENT DOCUMENTS

| | | |
|---|---|---|
| 10,271,283 B2 | 4/2019 | Mujtaba |
| 10,419,196 B2 | 9/2019 | Bendlin |
| 10,517,069 B2 | 12/2019 | Basu Mallick |
| 10,524,206 B2 | 12/2019 | Agarwal |
| 2019/0098596 A1 | 3/2019 | Basu Mallick |
| 2019/0260530 A1 | 8/2019 | Yi |

OTHER PUBLICATIONS

R1-1716019, Samsung, 'On Bandwidth Part operation', Sep. 18-21, 2017, 3GPP TSG RAN WG1 NR Ad-Hoc#3, pp. 1-5. (Year: 2017).*
R1-1906640, ZTE, 3GPP RAN WG1 #97, May 13-May 17, 2019, 'Procedure of cross-slot scheduling power saving techniques', pp. 1-4. (Year: 2019).*
R1-1903832, 3GPP TR 38.840 v1.0.0 (Mar. 2019), 3rd Generation Partnership Project: Technical Specification Group Radio Access Network, NR, Study on UE Power saving (Release 16), pp. 1-73. (Year: 2019).*
R1-1904986, Apple, 3GPP TSG RAN WG1 #96bis, 'Cross Slot Scheduling for UE Power Saving', pp. 1-9. (Year: 2019).*

* cited by examiner

K0=0

K0>0

DYNAMIC BANDWIDTH ADAPTATION WITH NETWORK SCHEDULING

PRIORITY INFORMATION

This application claims priority to U.S. provisional patent application Ser. No. 62/799,431, entitled "Dynamic Bandwidth Adaptation with Network Scheduling," filed Jan. 31, 2019, which is hereby incorporated by reference in its entirety as though fully and completely set forth herein.

FIELD

The present application relates to wireless communications, and more particularly to systems, apparatuses, and methods for dynamically adapting bandwidth use using network scheduling information in a cellular communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Embodiments are presented herein of apparatuses, systems, and methods for dynamically adapting bandwidth use using network scheduling information in a cellular communication system.

According to the techniques described herein, a wireless device may select a receiver bandwidth for each communication slot based on the likelihood that there will be downlink traffic in that slot. Thus, if there is no chance (or possibly a chance that is considered sufficiently low) that there will be downlink traffic in a slot, the wireless device may choose to use a narrower bandwidth (e.g., but still sufficiently wide to receive control channel resources that could potentially schedule a subsequent downlink communication) than the full bandwidth of an active bandwidth part of the wireless device. For example, it might be determined that there is no chance that there will be downlink traffic in a slot if same slot scheduling is not a configured scheduling option and no previous network scheduling information scheduled a downlink communication for the slot, as one possibility. In contrast, if there is a chance (or possibly a chance that is considered sufficiently high) that there will be downlink traffic in a slot, the wireless device may choose to use the full bandwidth of the active bandwidth part of the wireless device. For example, it may be determined that there is a high chance that there will be downlink traffic in a slot if a previous network scheduling information scheduled a downlink communication for the slot, as one possibility. As another possibility, it may be determined that there is a sufficiently high chance that there will be downlink traffic in a slot if same slot scheduling is a configured scheduling option, since in such a scenario the network could schedule a downlink communication in the same slot in which the downlink communication would be transmitted.

Such techniques may reduce the power consumption of wireless devices that implement them, at least according to some embodiments, e.g., since the power consumption to operate with a reduced receiver bandwidth may be less than the power consumption to operate with the full bandwidth of the active bandwidth part. At least some such reduced power consumption may be obtained without loss of network throughput or efficiency, e.g., if a reduced receiver bandwidth is selected only for slots in which there is no chance of downlink traffic, at least in some instances. Alternatively, potentially greater power consumption reduction may be achieved with still relatively low loss of network throughput and efficiency, e.g., if a reduced receiver bandwidth is selected for slots in which there is relatively low (but potentially non-zero) chance of downlink traffic, at least in some instances.

According to some embodiments, the network may support such dynamic bandwidth adaptation by wireless devices by implementing certain rules governing when same slot scheduling may be used and when same slot scheduling will not be used, such that wireless devices can better determine when there is no chance of downlink traffic. Some examples of such rules could include agreeing to not use same slot scheduling when a discontinuous reception timer value is greater than a certain threshold, agreeing to not use same slot scheduling when a wireless device is in a connected mode discontinuous reception on duration, and/or any of various other possible rules. Such techniques may increase the power consumption reducing potential of such dynamic bandwidth adaptation, e.g., since they may result in wireless devices being able to use reduced receiver bandwidth for a greater proportion of communication slots.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
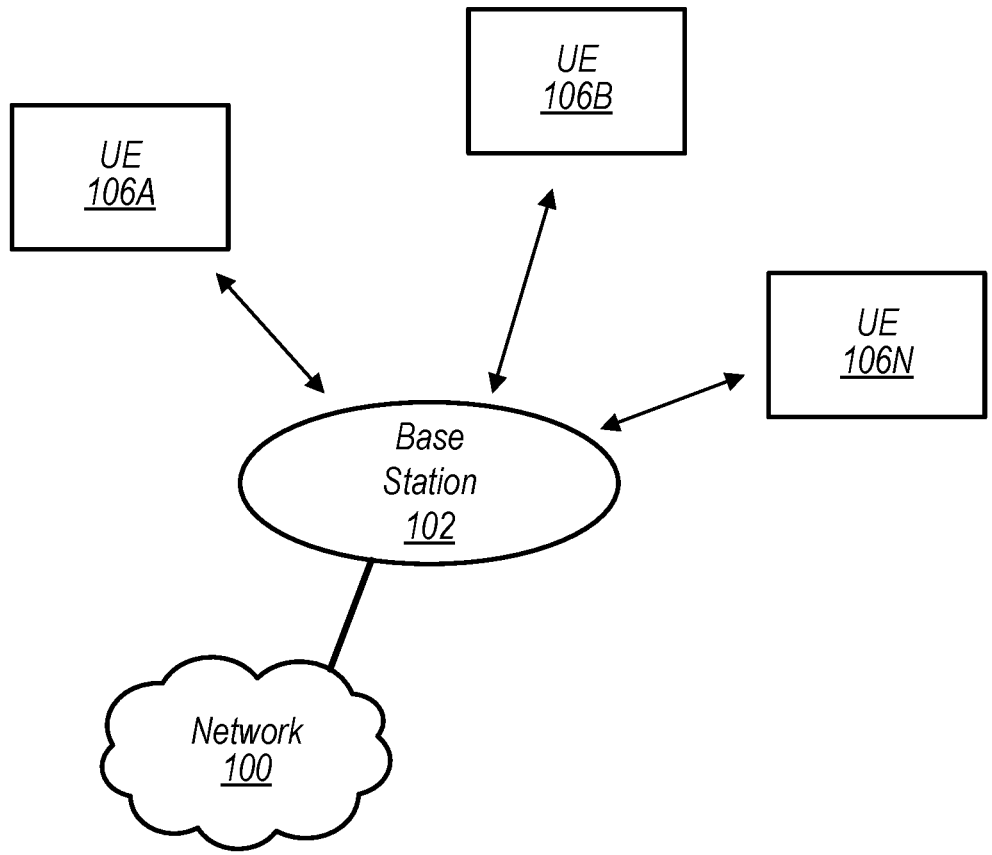
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
LAN: Local Area Network
WLAN: Wireless LAN
AP: Access Point
RAT: Radio Access Technology
IEEE: Institute of Electrical and Electronics Engineers
Wi-Fi: Wireless Local Area Network (WLAN) RAT based on the IEEE 802.11 standards Terms The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g. in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
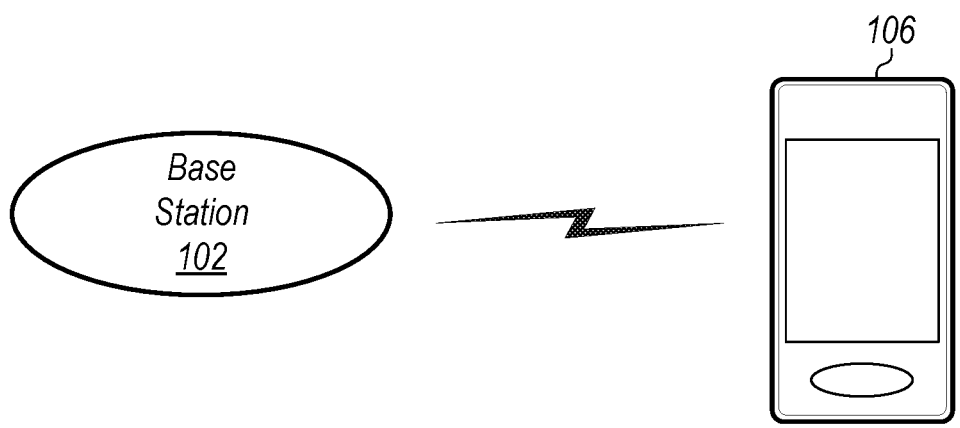
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to implement techniques for dynamically adapting bandwidth use using network scheduling information in a cellular communication system, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH'. Other configurations are also possible.

Figure 3:
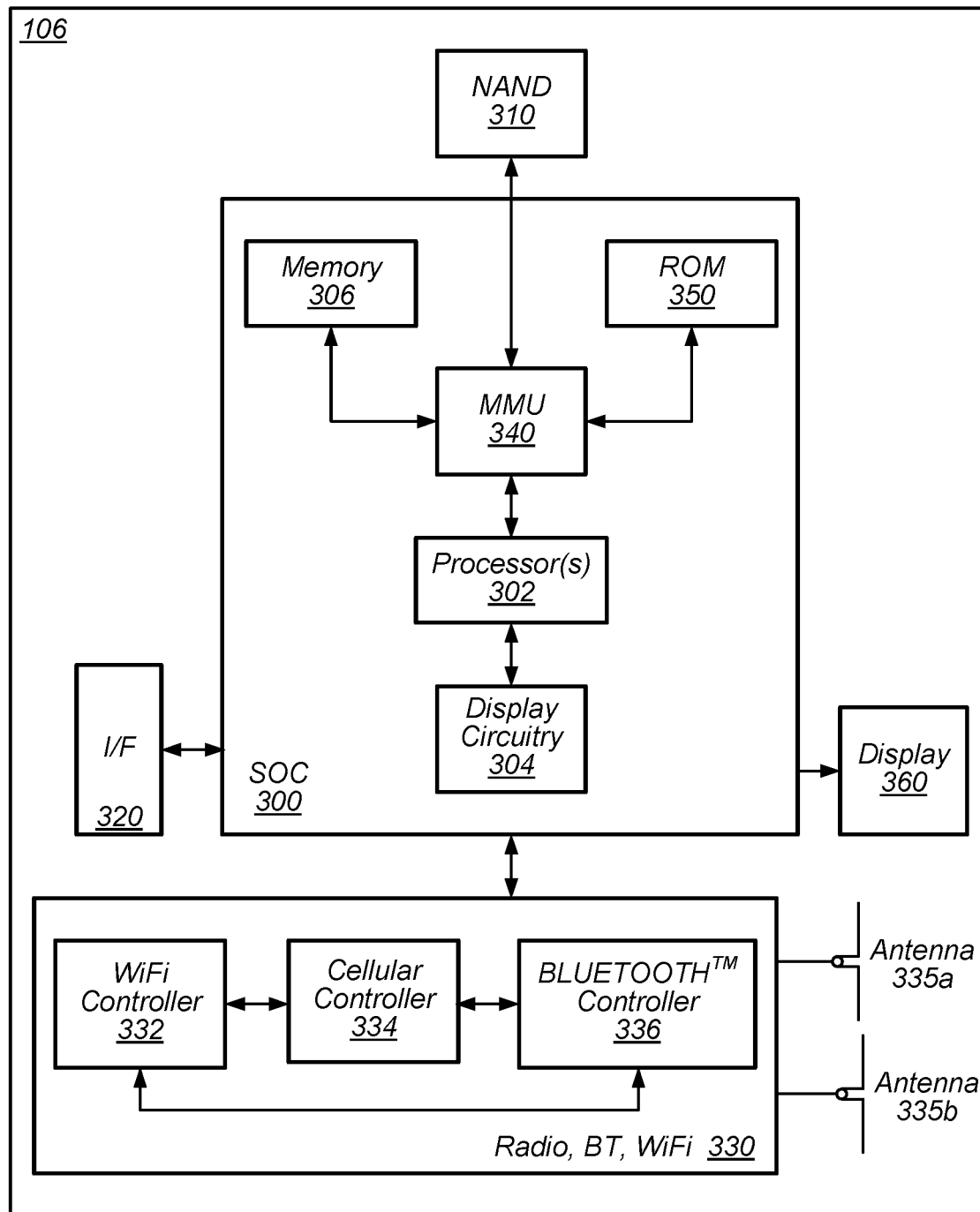
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g., 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to dynamically adapt bandwidth use using network scheduling information in a cellular communication system. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement such techniques in a cellular communication system according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 332, a cellular controller (e.g. NR controller) 334, and BLUETOOTH™ controller 336, and in at least some embodiments, one or more or all of these controllers may be implemented as respective integrated circuits (ICs or chips, for short) in communication with each other and with SOC 300 (and more specifically with processor(s) 302). For example, Wi-Fi controller 332 may communicate with cellular controller 334 over a cell-ISM link or WCI interface, and/or BLUETOOTH' controller 336 may communicate with cellular controller 334 over a cell-ISM link, etc. While three separate controllers are illustrated within radio 330, other embodiments have fewer or more similar controllers for various different RATs that may be implemented in UE device 106.

Figure 4:
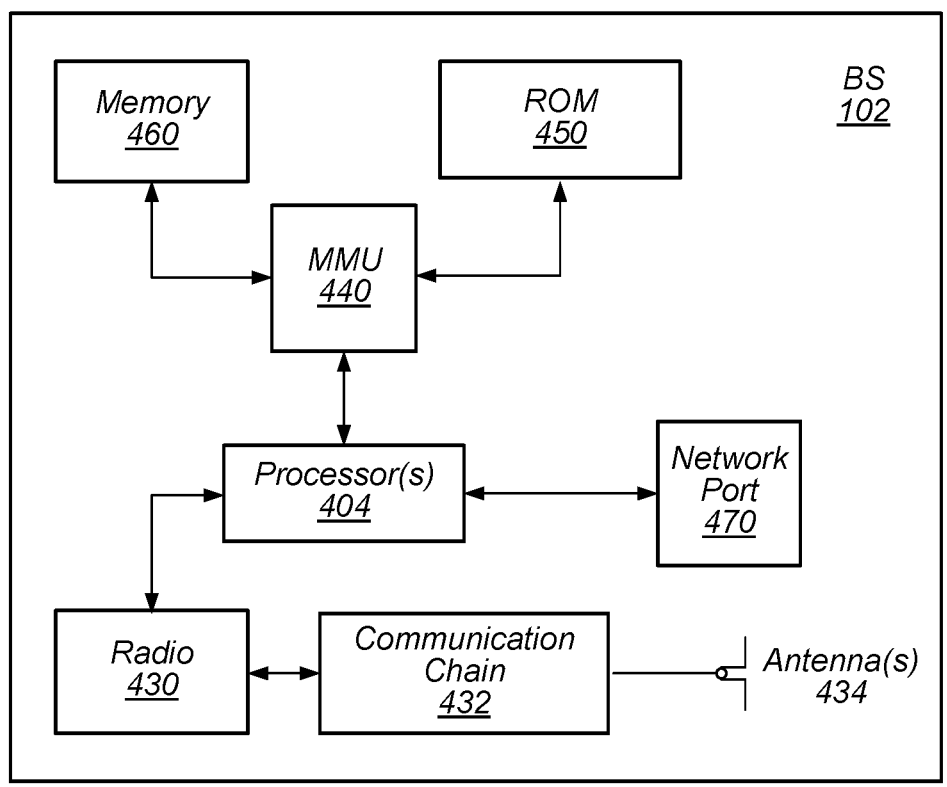
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. The base station 102 may operate according to the various methods as disclosed herein for wireless devices to dynamically adapt bandwidth use using network scheduling information in a cellular communication system.

Figure 5:
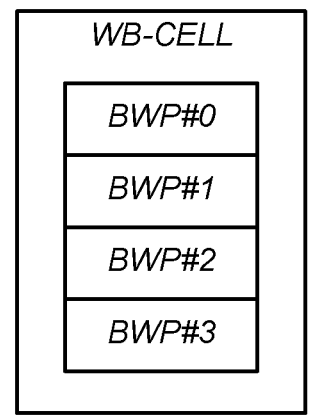
FIG. 5 illustrates aspects of an exemplary possible wideband cell having multiple possible bandwidth parts, according to some embodiments.
Figure 6:
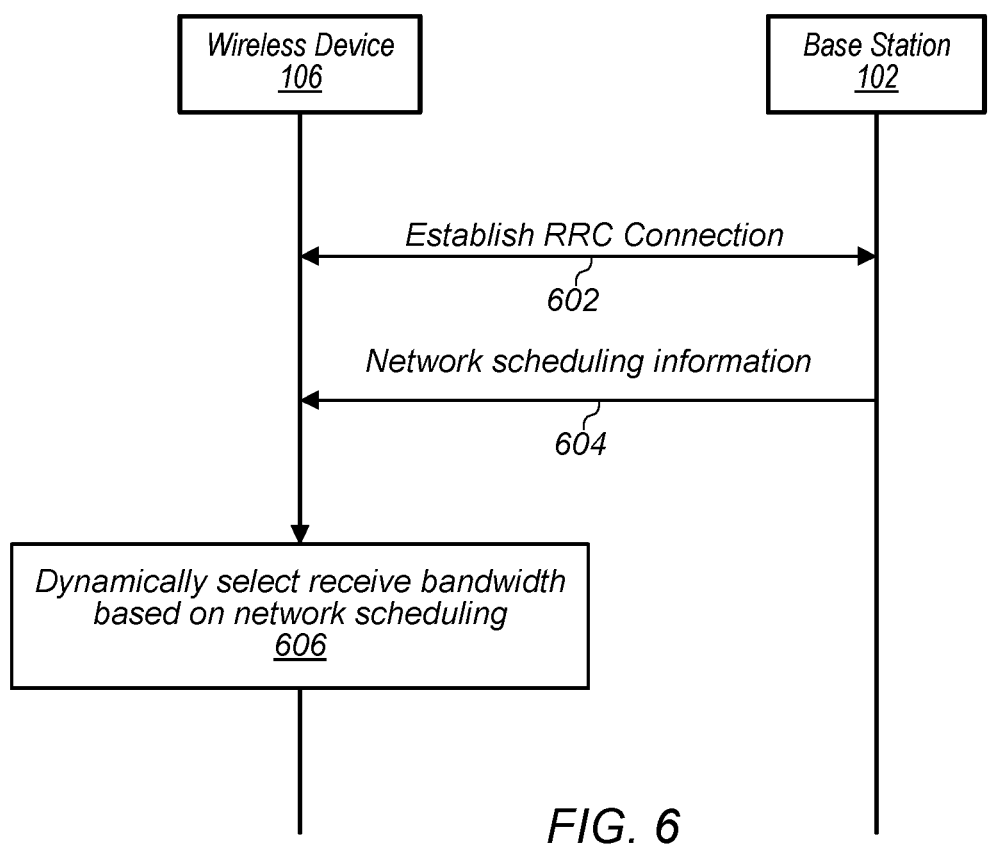
FIG. 6 is a communication flow diagram illustrating an exemplary possible method for indicating dynamically adapting bandwidth use using network scheduling information in a cellular communication system, according to some embodiments.

FIGS. 5-6—Dynamically Adapting Bandwidth Use

At least in some cellular communication systems, wideband cells may be provided by a cellular network. A wideband cell may include multiple bandwidth parts, e.g., such that it may be possible for a wireless device to be configured to utilize just a portion of the total cell bandwidth at a given time. FIG. 5 illustrates a possible representation of such a wideband cell including multiple possible bandwidth parts, according to some embodiments. In the illustrated example, the wideband (WB) cell may include four bandwidth parts (BWPs), i.e., BWP #0, BWP #1, BWP #2, and BWP #3. In other scenarios, different configurations (e.g., including a different number of BWPs, and/or any of various other possible differences) may also be possible for a WB (or other) cell. At least in some instances, different BWPs may include different amounts of bandwidth.

In some systems (e.g., at least some 5G NR deployments), it may be the case that a wireless device can only work on one BWP at a time (e.g., per component carrier) for each of uplink and downlink, though multiple BWPs may be configured for a given wireless device. For example, a wireless device may be configured to monitor a downlink control channel and perform data transmission/reception on an activated BWP, but may be configured to not monitor the downlink control channel or perform data transmission/reception on inactive BWPs.

For example, according to 3GPP Release 15, it may be the case that a maximum of 4 BWPs for downlink and a maximum of 4 BWPs for uplink can be configured as a set, with a maximum of 1 downlink BWP and 1 uplink BWP being active at a time, for each of the component carriers (serving cells).

As another possibility, it may be the case that a wireless device can operate on two active uplink BWPs at a time, in at least some instances, for example in the uplink if it is configured with a supplementary uplink (SUL) carrier, such as described in 3GPP TS 38.331 version 15.3.0, p. 156. Other configurations are also possible.

Any of a variety of techniques may be used for switching between active/activated BWPs. Two possible examples may include explicit and implicit activation techniques. When explicitly activating a BWP, signaling may explicitly be provided to a wireless device indicating that a certain BWP is being activated for the wireless device, for example using downlink control information. Implicitly activating a BWP may be based at least in part on a BWP inactivity timer. In such a case, a wireless device may be configured to have a default BWP, and may start the BWP inactivity timer when switching to a non-default BWP. Upon timer expiry, the wireless device may fallback to the default BWP, thus implicitly activating the default BWP. At least in some instances, it may be the case that the BWP inactivity timer can be restarted (e.g., extending the duration for which the non-default BWP is activated) when a successfully decoded downlink control information communication scheduling downlink data is received by the wireless device, and/or under one or more other conditions.

Allowing a wireless device to work on a bandwidth smaller than the entire cell bandwidth using such techniques may be beneficial, at least in some instances, for example with respect to wireless device power consumption, improving support for wireless devices that have lower bandwidth capabilities, and/or for providing interference mitigation qualities, among various possibilities.

However, it may be the case that there is no guarantee that such a bandwidth part framework is actually used to provide wireless device power consumption reduction benefits. For example, due to the signaling related overhead and increased complexity to network schedulers, it may be the case that bandwidth part changes may not be sufficiently dynamic to sufficiently enhance wireless device power savings.

Accordingly, it may be beneficial to provide a mechanism for a wireless device to perform bandwidth adaptation, e.g., based on the wireless device's own decision-making, to improve the power consumption profile of the wireless device without necessarily requiring bandwidth part changes. Such a mechanism could also be supported by additional signaling and/or rules agreed upon between the network and the wireless device.

Accordingly, FIG. 6 is a flowchart diagram illustrating a method for a wireless device (e.g., a wireless user equipment (UE) device) to dynamically adapt its bandwidth use using network scheduling information in a cellular communication system.

Aspects of the method of FIG. 6 may be implemented by a wireless device, e.g., in conjunction with a cellular base station, such as a UE 106 and a BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements.

Note that while at least some elements of the method of FIG. 6 are described in a manner relating to the use of communication techniques and/or features associated with NR and/or 3GPP specification documents, such description is not intended to be limiting to the disclosure, and aspects of the method of FIG. 6 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 6 may operate as follows.

In 602, the wireless device and the cellular base station may establish a wireless link. According to some embodiments, the wireless link may include a cellular link according to 5G NR. For example, the wireless device may establish a session with an AMF entity of the cellular network by way of a gNB that provides radio access to the cellular network. Note that the cellular network may also or alternatively operate according to another cellular communication technology (e.g., LTE, UMTS, CDMA2000, GSM, etc.), according to various embodiments.

Establishing the wireless link may include establishing a RRC connection with a serving cellular base station, at least according to some embodiments. Establishing the RRC connection may include configuring various parameters for communication between the wireless device and the cellular base station, establishing context information for the wireless device, and/or any of various other possible features, e.g., relating to establishing an air interface for the wireless device to perform cellular communication with a cellular network associated with the cellular base station. After establishing the RRC connection, the wireless device may operate in a RRC connected state.

According to some embodiments, during RRC connection establishment, the cellular base station may provide an indication of a set of possible scheduling gap values that can be used by the cellular base station when communicating with the wireless device. Alternatively, such information could be provided in broadcast system information, or may not be provided by the cellular base station. For example, it may be the case that possible scheduling gap values are pre-agreed between the wireless device and the cellular base station, e.g., based on proprietary agreements and/or because such values are specified in cellular communication standards documents for a cellular communication technology according to which the wireless device and the cellular base station are communicating.

In 604, the wireless device may receive network scheduling information from the cellular base station. For example, the wireless device may monitor a control channel (e.g., a physical downlink control channel (PDCCH)) for information scheduling one or more communications between the network and the wireless device. In some instances, the wireless device may receive control information in a communication slot that indicates that downlink traffic is scheduled for the same slot in which the control information is received (e.g., if same slot scheduling is configured, and is used by the network in that communication slot). In some instances, the wireless device may receive control information in a communication slot that indicates that downlink traffic is scheduled for a different slot than the slot in which the control information is received (e.g., if cross slot scheduling is configured, and is used by the network in that communication slot). In some instances, the wireless device may determine that there is no scheduling information for the wireless device on the control channel in a given slot. Other scenarios may also be possible.

In 606, the wireless device may dynamically select a receive bandwidth for receiving transmissions from the cellular base station based at least in part on the network scheduling information. The receive bandwidth may be selected from multiple possible bandwidths. As one possibility, the receive bandwidth may be selected from either a bandwidth associated with a full active bandwidth part of the wireless device (e.g., which may approximate or be slightly wider than the full active bandwidth part), or a bandwidth associated with control channel resources of the active bandwidth part of the wireless device (e.g., which may approximate or be slightly wider than the portion of the bandwidth part on which control channel resources are provided). In such a case, the bandwidth associated with the control channel resources may include less bandwidth (e.g., a narrower bandwidth) than the bandwidth associated with the full active bandwidth part.

The wireless device may select the full active bandwidth part bandwidth during slots when the wireless device has reason to expect that traffic that uses the full active bandwidth part may be transmitted to the wireless device by the cellular base station, and may select the bandwidth associated with the control channel resources during slots when the wireless device has reason to expect that no traffic using bandwidth beyond that of the control channel resources may be transmitted to the wireless device by the cellular base station, at least as one possibility. Thus, the wireless device may be able to operate using a reduced receive bandwidth (e.g., compared with the bandwidth of its active bandwidth part) during at least a portion of its operation, which may in turn reduce the power consumption of the wireless device (e.g., in comparison to always using a receive bandwidth at least equal to the bandwidth of the active bandwidth part when operating in connected mode).

For example, according to some embodiments, the wireless device may select the bandwidth associated with the full active bandwidth part of the wireless device for slots that are scheduled by the network scheduling information, and may select the bandwidth associated with the control channel resources of the active bandwidth part for slots that are not scheduled by the network scheduling information.

It should be noted, however, that a certain amount of time may be required for a wireless device to modify its receive bandwidth, such that it may not be possible to switch from the bandwidth associated with the control channel resources to the bandwidth associated with the full active bandwidth part of the wireless device within the span of time of a single slot, at least according to some embodiments. Accordingly, it may be the case that the wireless device only performs such dynamic receive bandwidth adaptation when there is at least a minimum time gap between receiving network scheduling information scheduling a downlink communication and the scheduled downlink communication that would be sufficient to adjust its receive bandwidth.

One possible way to determine whether such a minimum time gap is supported may be based on network scheduling configuration information. For example, the wireless device may receive network scheduling configuration information indicating a set of values that are configured as the possible minimum time gap (e.g., in slots, or in any other denomination) between when a downlink communication is scheduled and when the downlink communication is performed. If the indicated configured minimum possible time gap is sufficient for the wireless device to adjust its receive bandwidth, then the wireless device may dynamically adapt its receive bandwidth. For example, consider a scenario in which a wireless device can adjust its receive bandwidth within the time span of one slot. In such a scenario, as long as the minimum configured time gap is at least one slot (e.g., only cross slot scheduling is configured as a possibility), the wireless device may determine to dynamically adapt its receive bandwidth, while if the minimum configured time gap can be as few as zero slots (e.g., if same slot scheduling is configured as a possibility), the wireless device may determine not to dynamically adapt its receive bandwidth. This may allow the wireless device to avoid potentially missing a downlink communication that was scheduled using same slot scheduling in a slot for which the bandwidth associated with the control channel resources of the active bandwidth part was selected.

In some instances, the cellular base station may be configured to support such dynamic bandwidth adaptation by the wireless device (and possibly other wireless devices), for example by determining to use a certain minimum time gap between when a downlink communication is scheduled and when the downlink communication is performed under certain agreed-upon circumstances, which may for example correspond to periods of low traffic activity.

For example, at least according to some embodiments, the cellular base station and the wireless device may maintain a discontinuous reception (DRX) inactivity timer for the RRC connection while operating in connected mode, e.g., to help determine when to transition to connected mode DRX (C-DRX). Whenever the DRX inactivity timer is relatively low, there may be a greater likelihood of packet activity than when the DRX inactivity timer is relatively high, at least in some instances. Accordingly, the cellular base station could determine to use at least a certain minimum time gap (e.g., at least one slot, as one possibility) between when a downlink communication is scheduled and when the downlink communication is performed when the value of the DRX inactivity timer is greater than a certain (e.g., predetermined) threshold.

According to some embodiments, the cellular base station may provide an indication to the wireless device that it will select such a minimum time gap between providing scheduling information for a downlink communication and performing the downlink communication when the value of the DRX inactivity timer is greater than the predetermined threshold, e.g., so that the wireless device can determine whether to implement dynamic receive bandwidth adaptation based on the value of the DRX inactivity timer. Alternatively, such behavior by the cellular base station may be known to the wireless device without an explicit indication, e.g., if such behavior is specified according to a cellular communication standard according to which the wireless device and the cellular base station are communicating, or if a proprietary agreement is in place (e.g., such as between an infrastructure vendor that provided the cellular base station and a wireless device vendor that provided the wireless device), among various possibilities.

As another possibility, at least according to some embodiments, the cellular base station may (e.g., after determining that the DRX inactivity timer for the RRC connection with the wireless device has expired and transitioning to C-DRX operation with the wireless device) determine to use at least a certain minimum time gap (e.g., at least one slot, as one possibility) between when a downlink communication is scheduled and when the downlink communication is performed when providing scheduling information during a C-DRX on duration. In a similar manner as previously described herein, the cellular base station may explicitly indicate its use of a minimum time gap between scheduling and performing a downlink communication during a C-DRX on duration, or such use may be implicitly understood between the cellular base station and the wireless device, e.g., based on cellular communication standard specifications, proprietary agreement, etc.

Thus, if the cellular base station is known to support use of a certain minimum time gap under certain circumstances such as when a DRX inactivity timer has a value greater than a predetermined threshold or during a C-DRX on duration, the wireless device may also or alternatively determine to dynamically adapt its receive bandwidth based at least in part on whether such circumstances are occurring. For example, according to some embodiments, if network scheduling configuration information indicates that a minimum time gap between scheduling and performing downlink communications is less than the wireless device requires to modify its receive bandwidth, the wireless device may not dynamically select its receive bandwidth for receiving transmissions when the DRX inactivity timer value is below the predetermined threshold, but the wireless device may dynamically select its receive bandwidth for receiving transmissions when the DRX inactivity timer value is above the predetermined threshold. As another example, the wireless device may select the bandwidth associated with control channel resources of the active bandwidth part for C-DRX on duration operation if the cellular base station is known to support use of a sufficient minimum time gap during C-DRX on duration.

Thus, according to some embodiments, the wireless device may determine to dynamically select its receive bandwidth for receiving transmissions only when a minimum time gap is configured that is sufficient to allow for modifying the receive bandwidth in time to receive all scheduled downlink transmissions. In other words, the wireless device may select a receive bandwidth that is narrower than the full active bandwidth part bandwidth only during slots when the likelihood of data traffic arrival is zero, according to such embodiments.

However, according to some embodiments, it may also be possible for the wireless device to determine the likelihood of traffic arrival in each slot, and to dynamically select its receive bandwidth for receiving transmissions based at least in part on such a determined likelihood, such that the likelihood threshold for selecting a receive bandwidth that is narrower than the full active bandwidth part bandwidth is greater than zero. In other words, according to such embodiments, it may be possible for the wireless device to select a receive bandwidth that is narrower than the full active bandwidth part bandwidth for a slot even when there may be a chance that traffic arrives during that slot, e.g., as long as the likelihood of such arrival is determined to be below a certain threshold.

For example, according to some embodiments, the wireless device may dynamically select a first receive bandwidth (e.g., the bandwidth associated with the control channel resources) for receiving transmissions for communication slots for which the determined likelihood of traffic arrival is low (e.g., below a predetermined or adaptive threshold), and dynamically select a second receive bandwidth (e.g., the bandwidth associated with the full active bandwidth part) for receiving transmissions for communication slots for which the determined likelihood of traffic arrival is high (e.g., above the predetermined or adaptive threshold), where the first receive bandwidth is narrower than the second receive bandwidth.

The likelihood of traffic arrival may be determined in any of various ways, based on any of various considerations. Such considerations may include any or all of those considerations previously described herein, potentially including the configured minimum gap between receiving network scheduling information and performing communication scheduled by the network scheduling information as indicated by the cellular base station, the current value of the DRX inactivity timer, whether network scheduling information indicating a scheduled downlink communication has been received (and for which slot the downlink communication is scheduled, and/or if such network scheduling information has been received), whether the wireless device is in a C-DRX on-duration. Additionally or alternatively, the determination of the likelihood of traffic arrival may be based on recent traffic history (e.g., how often traffic has been arriving), active traffic type(s), device type, battery reserve levels, and/or any of various other considerations. Further, if desired, the threshold of likelihood of traffic arrival based on which the wireless device dynamically selects its receive bandwidth may also or alternatively be dynamically selected based on any or all such consideration, at least according to some embodiments.

Note that when using such an approach, it may be the case that the wireless device can miss initial downlink transmissions on some occasions. For example, the wireless device may receive network scheduling information scheduling a downlink communication from the cellular base station in a certain slot, for which the wireless device had already selected a receive bandwidth that is narrower than the bandwidth of the scheduled downlink communication. In such a case, the wireless device may select a wider receive bandwidth (e.g., the bandwidth associated with the full active bandwidth part) for one or more subsequent slots based on missing the initial downlink communication, e.g., at least until a retransmission of the scheduled downlink communication is received. Thus, even if some initial transmissions may be missed by a wireless device when using a likelihood of traffic arrival based approach (e.g., and in which the likelihood-of-arrival threshold for selecting a bandwidth that is narrower than the full active bandwidth part is greater than zero) to dynamically selecting its receive bandwidth, the wireless device may still be able to receive the data during a retransmission attempt by the cellular base station. Further, in such a case, if the wireless device can receive the initial transmission partially (e.g., with its relatively narrow bandwidth), then the received partial signal could be combined with a retransmission received with a wider bandwidth to improve decoding performance.

FIGS. 7-12 and Additional Information

FIGS. 7-12 illustrate various aspects of possible schemes that could be used for dynamically adapting bandwidth use using network scheduling information in a cellular communication system, according to some embodiments. Note that FIGS. 7-12 and the following information are provided as being illustrative of further considerations and possible implementation details relating to the method of FIG. 6, and are not intended to be limiting to the disclosure as a whole. Numerous variations and alternatives to the details provided herein below are possible and should be considered within the scope of the disclosure.

Figure 7:
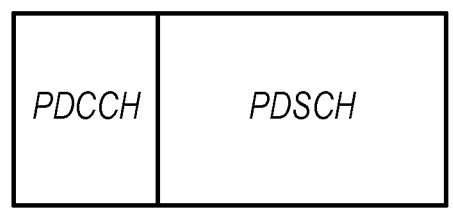
FIG. 7 illustrates aspects of exemplary same slot scheduling and cross slot scheduling arrangements, according to some embodiments.
Figure 7:
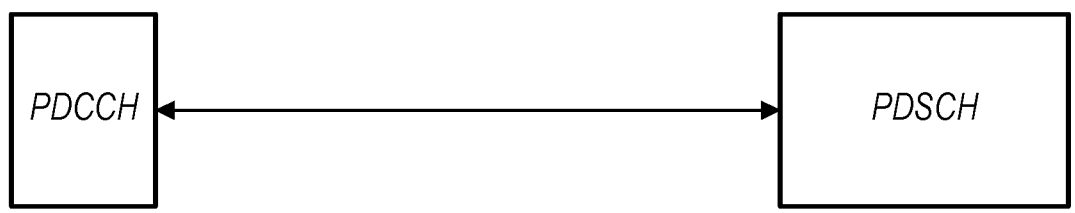

FIG. 7 illustrates aspects of exemplary possible network scheduling approaches, according to some embodiments. In NR, the slot in which the physical downlink control channel (PDCCH) is transmitted can be different from the slot in which the corresponding physical downlink shared channel (PDSCH) is transmitted. The distance between such slots may be indicated using a scheduling parameter that may be referred to as 'K0'. K0 may denote the distance between the PDCCH and the corresponding PDSCH in slots. Thus, when K0=0, the PDCCH scheduling a downlink transmission on the PDSCH may be transmitted in the same slot as the corresponding PDSCH is transmitted, such as illustrated in the upper portion of FIG. 7. This may also be referred to as same slot scheduling. When K0>0, the PDCCH scheduling a downlink transmission on the PDSCH may be transmitted in a different slot than the corresponding PDSCH is transmitted, such as illustrated in the lower portion of FIG. 7. This may also be referred to as cross slot scheduling.

It may be generally beneficial for wireless device power saving to use K0 values greater than 0, at least according to some embodiments. For example, when the minimum K0 value is greater than 0 and aperiodic CSI-RS triggering offset is not within a certain duration, a wireless device may be able to switch to a micro sleep operation right away after PDCCH reception, as the wireless device may know that no additional PDSCH and CSI signal reception is needed within the given duration (e.g., the same slot).

As previously noted herein, NR may also support wireless device channel bandwidth adaptation through the BWP framework, according to which the wireless device channel bandwidth can be changed by the network through a BWP change. However, as further previously noted, it may be the case that such a BWP framework may not be utilized in a sufficiently dynamic manner by the network to provide as much wireless device power savings as could be possible. Accordingly, mechanisms for dynamic bandwidth adaptation by wireless devices, e.g., that can be implemented at a wireless device using decision making by the wireless device, may provide additional power consumption reduction benefits to wireless devices. Such mechanisms may also potentially benefit further from network support for certain additional signaling and/or rules to improve the wireless devices' capability to effectively implement the mechanisms.

One possible approach to such dynamic bandwidth adaptation may be based at least in part on possible K0 values that are configured for a wireless device. For example, if all possible K0 values that could potentially be signaled to a wireless device by downlink control information are greater than 0, this may indicate that there is a guaranteed time gap between the PDCCH and the corresponding PDSCH, which may be long enough for the wireless device to adjust its RF bandwidth for PDSCH reception.

Figure 8:
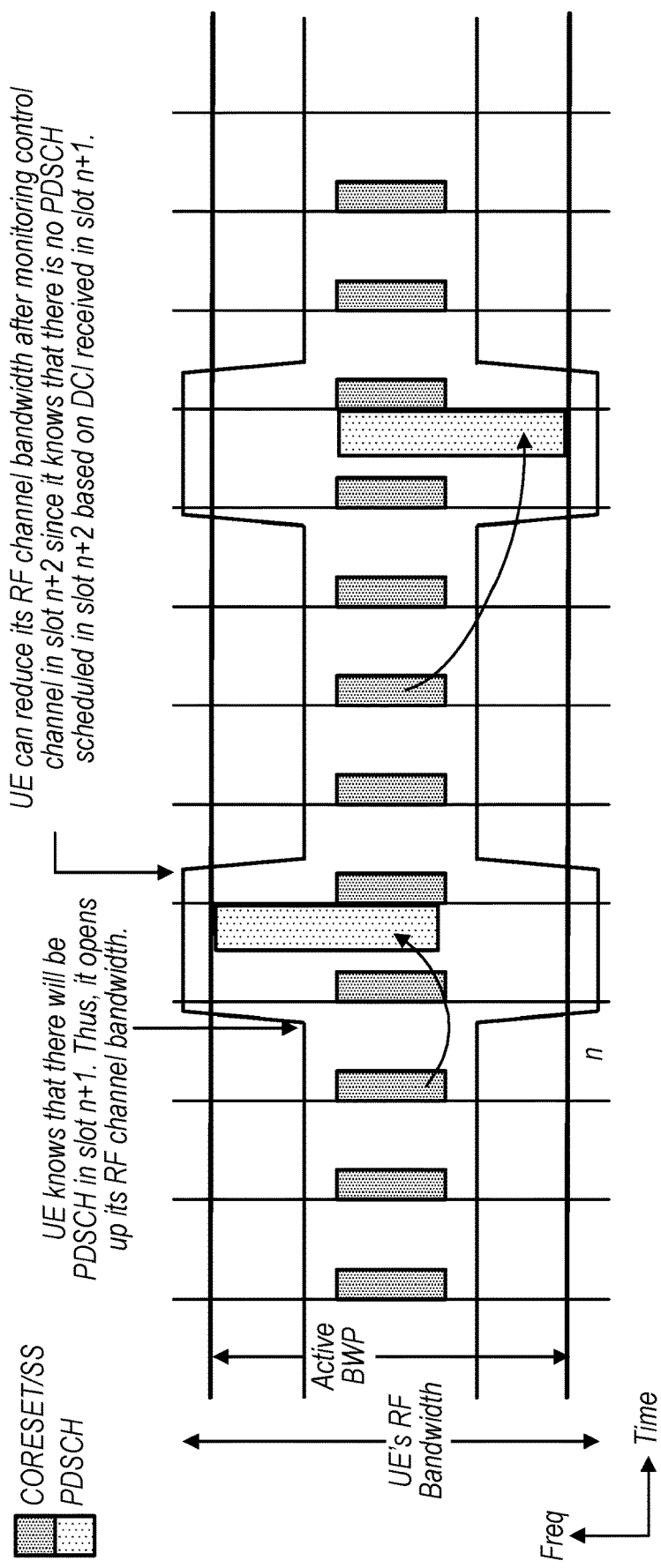
FIG. 8 illustrates aspects of an exemplary scheme for dynamic bandwidth selection based on network scheduling, according to some embodiments.

Thus, as one possible approach, when a wireless device knows that potential K0 values that can be indicated are all larger than 0, in a given slot n, if the wireless device determines that there is no PDSCH to receive, then the wireless device could reduce its channel bandwidth to the point where it can monitor the control resource set (CORESET) only, to reduce power consumption. If, however, in the given slot n, if the wireless device is supposed to receive data on the PDSCH based on previously received downlink control information and the wireless device's current channel bandwidth is smaller than the size of the configured BWP, the wireless device could open up its RF channel bandwidth to the size of the configured BWP to receive the PDSCH. Thus, the wireless device may open up its RF channel bandwidth only when there is a scheduled PDSCH. FIG. 8 is a time-frequency diagram illustrating how such dynamic bandwidth adaptation might proceed using such an approach in an exemplary scenario, according to some embodiments.

Figure 9:
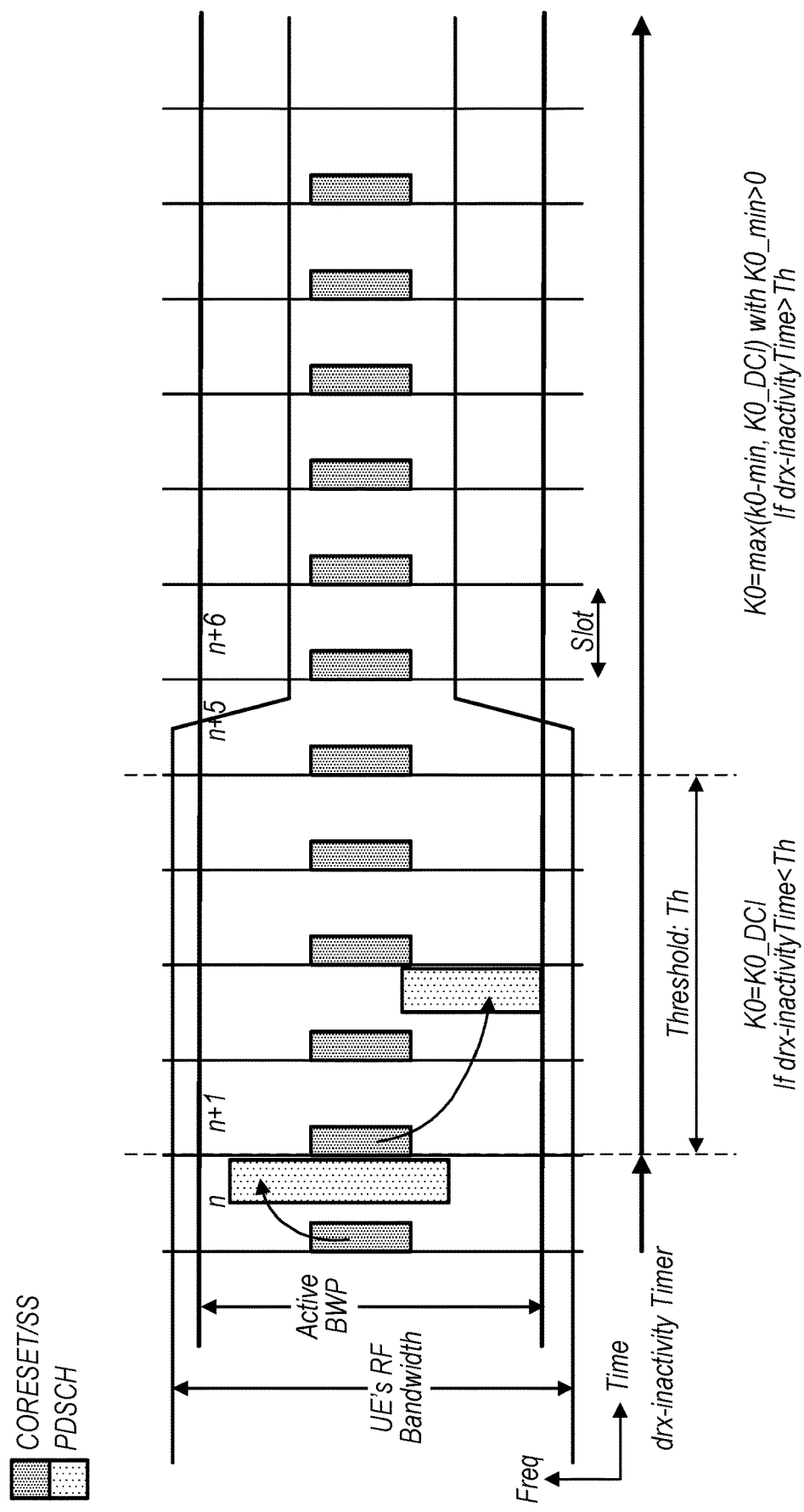
FIGS. 9-10 illustrates aspects of an exemplary scheme for dynamic bandwidth selection based on network scheduling and a discontinuous reception inactivity timer, according to some embodiments.
Figure 10:
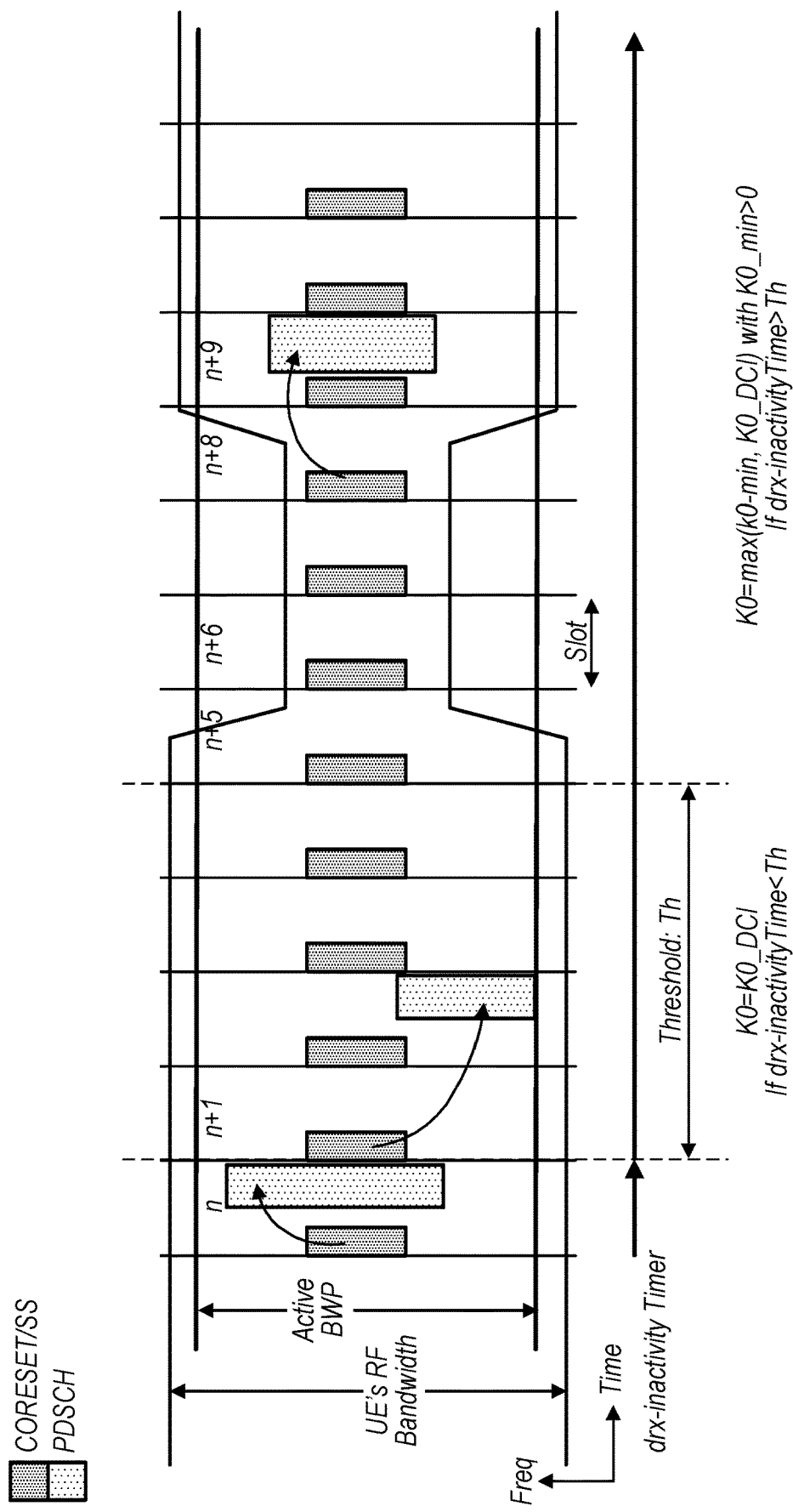

The value of the drx-inactivityTimer in DRX mode may roughly capture the intensity of traffic arrival, e.g., since this inactivity timer may be reset every time a new packet arrives, at least according to some embodiments. When the traffic arrival rate is low, it may be beneficial to use a minimum K0>0 requirement, e.g., to give wireless devices the opportunity to operate in narrower bandwidth for power savings. Accordingly, as a further possibility, when DRX is configured (e.g., when a DRX inactivity timer is running while operating in connected mode), the network may conform to a minimum K0>0 requirement when the current drx-inactivityTimer value is greater than a certain threshold (e.g., since this time period may correspond to a window of low traffic arrival rate), but may select any K0 value configured in the network provided K0 table (e.g., a time domain resource allocation table) when the current drx-inactivityTimer value is less than the threshold (e.g., since this time period may correspond to a window of high traffic arrival rate). Such limiting of K0 to non-zero values during windows of low traffic arrival may increase the opportunities for wireless devices to implement dynamic bandwidth adaptation. FIGS. 9-10 are time-frequency diagrams illustrating how such dynamic bandwidth adaptation might proceed using such an approach in two exemplary scenarios, according to some embodiments.

Figure 11:
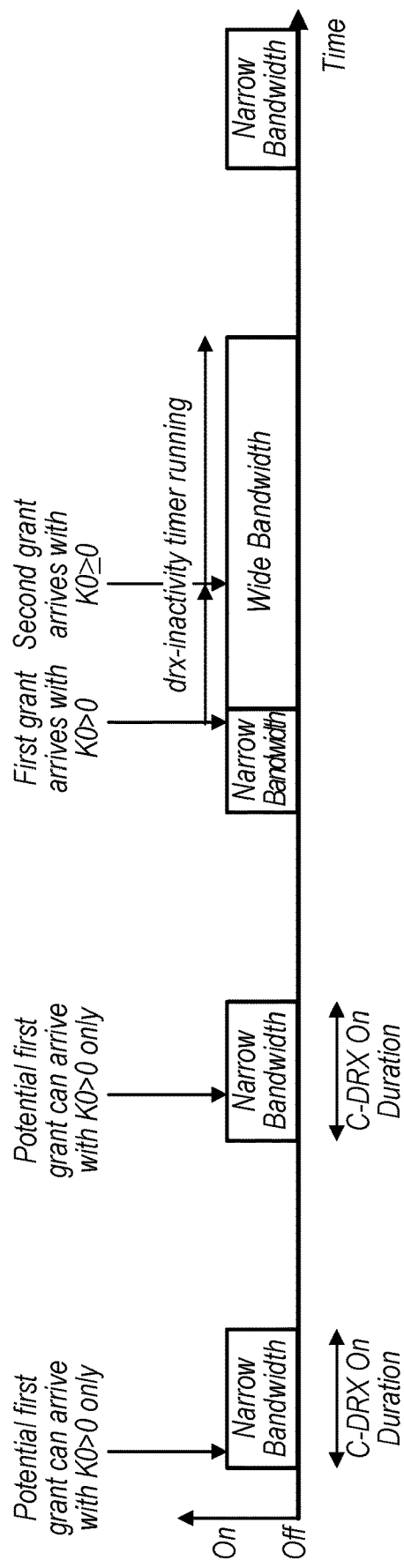
FIG. 11 illustrates aspects of an exemplary scheme for dynamic bandwidth selection based on connected-mode discontinuous reception operation, according to some embodiments.

Additionally, when a wireless device is in C-DRX on duration (e.g., with the drx-inactivityTimer not running), there may be a high likelihood that the wireless device does not receive data actively. Thus, it may make sense to allow wireless devices to operate with narrow bandwidth while in C-DRX on duration. Accordingly, as a still further possibility, a wireless device could be configured with a K_min value, which may be greater than 0. If the drx-inactivityTimer is not running, the network may agree that the potential K0 that can be indicated is limited to K0>K_min. In such a case, the wireless device may be able to implement dynamic bandwidth adaptation (e.g., such that a narrow bandwidth can be selected) during C-DRX on duration. FIG. 11 is a time-frequency diagram illustrating how such dynamic bandwidth adaptation might proceed using such an approach in an exemplary scenario, according to some embodiments.

While the preceding example approaches and scenarios of FIGS. 8-11 may utilize an approach to dynamic bandwidth adaptation in which an RF bandwidth that is narrower than the configured BWP is selected for a wireless device only if there is no chance of downlink traffic in a given slot, it may also be possible to use an approach to dynamic bandwidth adaptation in which an RF bandwidth that is narrower than the configured BWP can be selected for a wireless device even when there is a non-zero chance of downlink traffic in a given slot. For example, when the wireless device determines that there is a low chance of traffic arrival in a given slot, then the wireless device may choose to reduce its RF bandwidth, e.g., to monitor the CORESET only. This could potentially cause the wireless device to miss an upcoming new initial transmission which is scheduled outside of the (e.g., reduced) RF bandwidth of the wireless device. However, it may be the case that such a risk of missing a PDSCH transmission may be considered worthwhile, e.g., to reduce power consumption, particularly since the missed transport block (TB) may be retransmitted. Note that since the bandwidth reduction decision may be made by the wireless device itself, such a more flexible approach may allow the wireless device to manage its preferred trade-off between power consumption, latency, throughput, and/or other considerations in a more finely-grained manner.

Figure 12:
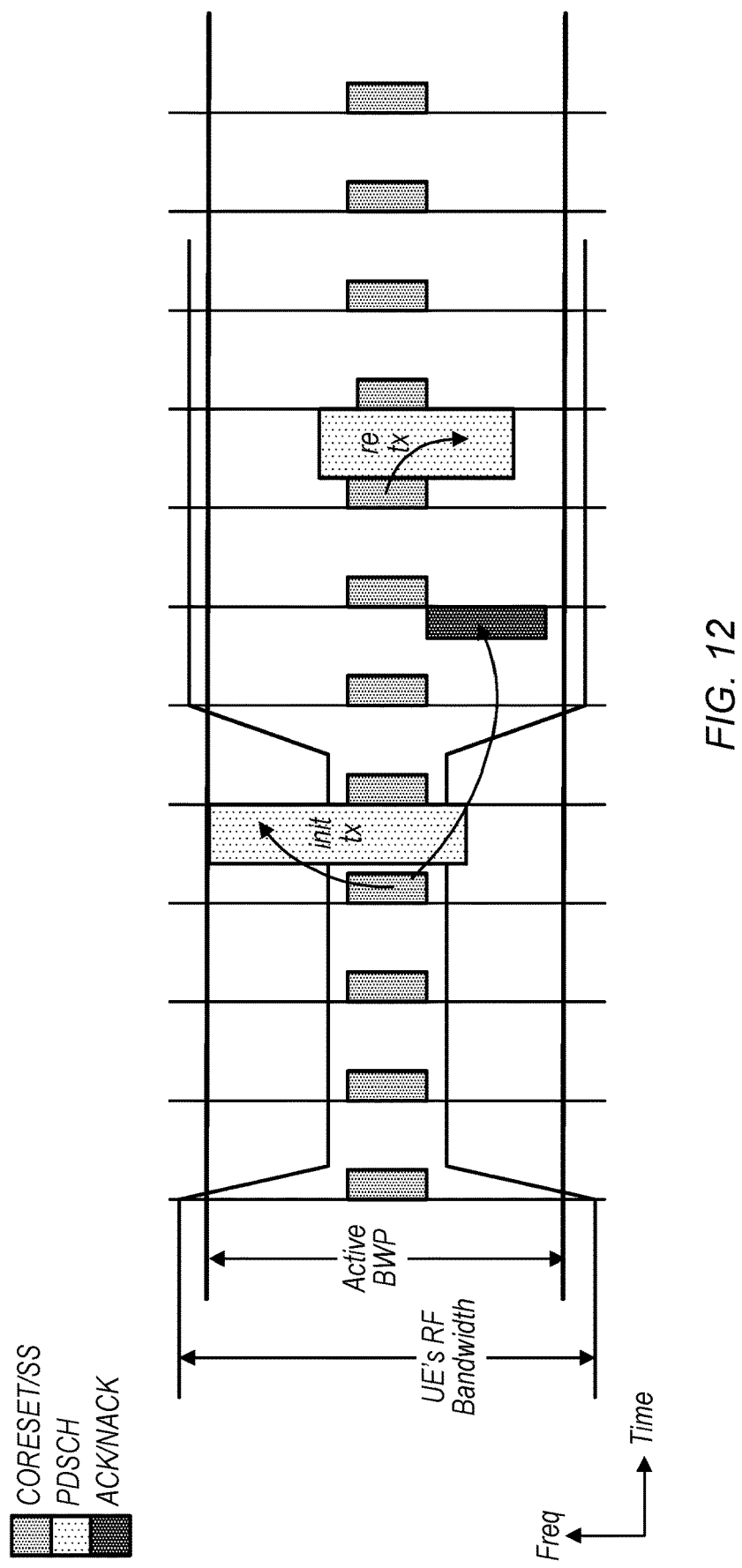
FIG. 12 illustrates aspects of an exemplary scheme for dynamic bandwidth selection based on likelihood of traffic arrival, according to some embodiments.

According to such an approach, if there is no PDSCH to receive, then the wireless device may be able to reduce its bandwidth to an extent that is wide enough to monitor its CORESET only. This reduced bandwidth may thus be smaller than the active BWP size. In this mode, the wireless device may receive PDCCH symbols only via the reduced bandwidth. The wireless device may not receive/buffer other symbols for potential PDSCH reception. Components related to PDSCH decoding could be in a low power state for this mode. Once the wireless device detects a PDCCH carrying a downlink grant, then the wireless device could miss (part of) the corresponding PDSCH, e.g., in case the PDSCH is transmitted outside of the wireless device's current reduced bandwidth. If the wireless device does detect a PDCCH carrying a grant, the wireless device may open its RF as soon as possible to cover the bandwidth of the active BWP and move to normal bandwidth mode. If the wireless device can receive the scheduled PDSCH without moving to normal bandwidth mode, the wireless device may remain in CORESET only mode. In the normal bandwidth mode, the wireless device's RF bandwidth may be wide enough to cover the full active BWP. Thus, the wireless device may be able to receive any following retransmissions for the same transport block. If the data arrival rate is determined (e.g., at a later time) to be sufficiently low, the wireless device may move back to the CORESET only mode. Note that it may be possible to support such an approach on the wireless device side without requiring any cellular standard specification changes or specific network support, though it may be possible that such support could improve the efficiency of such an approach, at least according to some embodiments. FIG. 12 is a time-frequency diagram illustrating how such dynamic bandwidth adaptation might proceed using such an approach in an exemplary scenario, according to some embodiments.

In the following further exemplary embodiments are provided.

One set of embodiments may include a wireless device, comprising: an antenna; a radio coupled to the antenna; and a processing element coupled to the radio; wherein the wireless device is configured to: establish a radio resource control (RRC) connection with a cellular base station according to a first radio access technology (RAT); receive network scheduling information from the cellular base station; and dynamically select a receive bandwidth for receiving transmissions from the cellular base station based at least in part on the network scheduling information.

According to some embodiments, to dynamically select the receive bandwidth, the wireless device is further configured to select the receive bandwidth from one of: a bandwidth associated with a full active bandwidth part of the wireless device; or a bandwidth associated with control channel resources of the active bandwidth part of the wireless device, wherein the bandwidth associated with control channel resources of the active bandwidth part comprises less bandwidth than the bandwidth associated with the full active bandwidth part.

According to some embodiments, the wireless device is further configured to: select the bandwidth associated with the full active bandwidth part of the wireless device for slots that are scheduled by the network scheduling information; and select the bandwidth associated with control channel resources of the active bandwidth part for slots that are not scheduled by the network scheduling information.

According to some embodiments, the wireless device is further configured to: select the bandwidth associated with control channel resources of the active bandwidth part for connected mode discontinuous reception on duration operation.

According to some embodiments, the network scheduling information comprises network scheduling configuration information indicating whether same slot scheduling is a configured network scheduling option, wherein the wireless device is further configured to: determine to dynamically select a receive bandwidth for receiving transmissions based at least in part on the network scheduling configuration information indicating that same slot scheduling is not a configured network scheduling option, wherein a receive bandwidth for receiving transmissions is not dynamically selected when the network scheduling configuration information indicates that same slot scheduling is a configured network scheduling option.

According to some embodiments, the wireless device is further configured to: determine to dynamically select a receive bandwidth for receiving transmissions based at least in part on a discontinuous reception (DRX) inactivity timer value being above a predetermined threshold, wherein a receive bandwidth for receiving transmissions is not dynamically selected when the DRX inactivity timer value is below the predetermined threshold.

According to some embodiments, the wireless device is further configured to: determine a likelihood of traffic arrival at each communication slot with the cellular base station; dynamically select a first receive bandwidth for receiving transmissions for communication slots for which the determined likelihood of traffic arrival is low; and dynamically select a second receive bandwidth for receiving transmissions for communication slots for which the determined likelihood of traffic arrival is high, wherein the first receive bandwidth is narrower than the second receive bandwidth.

Another set of embodiments may include an apparatus, comprising a processing element configured to cause a wireless device to: establish a radio resource control (RRC) connection with a cellular base station according to a first radio access technology (RAT); determine a likelihood of traffic arrival at each communication slot with the cellular base station; and dynamically select a receive bandwidth for each communication slot with the cellular base station based at least in part on the determined likelihood of traffic arrival.

According to some embodiments, to dynamically select the receive bandwidth, the processing element is further configured to cause the wireless device select the receive bandwidth from one of: a full bandwidth of an active bandwidth part of the wireless device; or a bandwidth associated with control channel resources of the active bandwidth part of the wireless device, wherein the bandwidth associated with control channel resources of the active bandwidth part comprises less bandwidth than the full bandwidth of the active bandwidth part.

According to some embodiments, to dynamically select the receive bandwidth, the processing element is further configured to cause the wireless device to: select a narrower receive bandwidth for communication slots with determined likelihood of traffic arrival below a predetermined threshold; and select a wider receive bandwidth for communication slots with determined likelihood of traffic arrival above a predetermined threshold.

According to some embodiments, the likelihood of traffic arrival is determined based at least in part on a configured minimum gap between receiving network scheduling information and performing communication scheduled by the network scheduling information.

According to some embodiments, the likelihood of traffic arrival is determined based at least in part on a current value of a discontinous reception (DRX) inactivity timer.

According to some embodiments, the likelihood of traffic arrival is determined based at least in part on network scheduling information indicating whether traffic is scheduled at each communication slot with the cellular base station.

According to some embodiments, the likelihood of traffic arrival is determined based at least in part on whether the wireless device is in a connected-mode discontinous reception on duration.

According to some embodiments, the processing element is further configured to: receive network scheduling information scheduling a downlink communication from the cellular base station in a first slot, wherein the scheduled downlink communication has a wider bandwidth than a receive bandwidth that was selected for the first slot; select a receive bandwidth that is at least as wide as the first bandwidth for one or more slots subsequent to the first slot based at least in part on the receiving the network scheduling information scheduling the downlink communication in the first slot; and receive a retransmission of the downlink communication during one of the one or more slots subsequent to the first slot.

A further set of embodiments may include a cellular base station, comprising: an antenna; a radio coupled to the antenna; and a processing element coupled to the radio; wherein the cellular base station is configured to: establish a radio resource control (RRC) connection with a wireless device according to a first radio access technology (RAT); maintain a discontinuous reception (DRX) inactivity timer for the RRC connection with the wireless device; and provide scheduling information for a downlink communication to the wireless device, wherein a time gap between providing the scheduling information and performing the downlink communication is selected based at least in part on a value of the DRX inactivity timer.

According to some embodiments, the cellular base station is further configured to: select a minimum time gap of at least one slot between providing scheduling information for a downlink communication and performing the downlink communication when the value of the DRX inactivity timer is greater than a predetermined threshold.

According to some embodiments, the cellular base station is further configured to: provide an indication to the wireless device that the cellular base station will select a minimum time gap of at least one slot between providing scheduling information for a downlink communication and performing the downlink communication when the value of the DRX inactivity timer is greater than the predetermined threshold.

According to some embodiments, the cellular base station is further configured to: determine that the DRX inactivity timer for the RRC connection with the wireless device has expired; transition to a connected-mode DRX (C-DRX) operation with the wireless device; and provide scheduling information for a downlink communication to the wireless device during a C-DRX on duration, wherein a time gap between providing the scheduling information and performing the downlink communication is selected based at least in part on scheduling information being provided during a C-DRX on duration.

According to some embodiments, the cellular base station is further configured to: select a minimum time gap of at least one slot between providing scheduling information for a downlink communication and performing the downlink communication when the scheduling information is being provided during a C-DRX on duration.

A still further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A yet further exemplary embodiment may include a non-transitory computer accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A cellular base station, comprising:
an antenna;
a radio coupled to the antenna; and
a processor coupled to the radio;
wherein the cellular base station is configured to:
    establish a radio resource control (RRC) connection with a wireless device according to a first radio access technology (RAT);
    provide a first downlink control information (DCI) message scheduling a first physical downlink shared channel (PDSCH) transmission to the wireless device, wherein a time gap between providing the first DCI and the first PDSCH transmission is given by a parameter K0, wherein K0 is indicated in the first DCI and a set of possible K0 values includes K0=0;
    configure the wireless device with a K0 minimum value (K0_min) to be greater than zero to enable power savings at the wireless device; and
    provide, after the configuration with K0_min, a second DCI message for scheduling a second PDSCH transmission to the wireless device, wherein the set of possible K0 values for the scheduling does not include K0=0.

2. The cellular base station of claim 1, wherein the cellular base station is further configured to:

maintain a discontinuous reception (DRX) inactivity timer for the RRC connection with the wireless device, wherein the time gap is selected based on a value of the DRX inactivity timer.

3. The cellular base station of claim 2, wherein the cellular base station is further configured to:
select a minimum time gap of at least one slot between providing a third DCI message scheduling a third PDSCH transmission to the wireless device and performing the third PDSCH transmission when the value of the DRX inactivity timer is greater than a predetermined threshold.

4. The cellular base station of claim 3, wherein the cellular base station is further configured to:
provide an indication to the wireless device that the cellular base station will select the minimum time gap of at least one slot between providing the third DCI message scheduling the third PDSCH transmission and performing the third PDSCH transmission when the value of the DRX inactivity timer is greater than the predetermined threshold.

5. The cellular base station of claim 2, wherein the cellular base station is further configured to:
determine that the DRX inactivity timer for the RRC connection with the wireless device has expired;
transition to a connected-mode DRX (C-DRX) operation with the wireless device; and
provide a third DCI message scheduling a third PDSCH transmission to the wireless device during a C-DRX on duration, wherein a third time gap between providing the third DCI message scheduling the third PDSCH transmission and performing the third PDSCH transmission is selected based at least in part on the third DCI message being provided during the C-DRX on duration.

6. The cellular base station of claim 5, wherein the cellular base station is further configured to:
select a minimum time gap of at least one slot between providing the third DCI message scheduling the third PDSCH transmission and performing the third PDSCH transmission based at least in part on the third DCI message being provided during the C-DRX on duration.

7. The cellular base station of claim 1, wherein the configuration with K0_min is based on a traffic arrival rate for the wireless device.

8. A wireless device, comprising:
an antenna;
a radio coupled to the antenna; and
a processor coupled to the radio and configured to cause the wireless device to:
establish a radio resource control (RRC) connection with a cellular base station according to a first radio access technology (RAT);
receive, from the cellular base station, a first downlink control information (DCI) message scheduling a first physical downlink shared channel (PDSCH) transmission to the wireless device, wherein a time gap between receiving the first DCI and the first PDSCH transmission is given by a parameter K0, wherein K0 is indicated in the first DCI and a set of possible K0 values includes K0=0;
receive, from the cellular base station, configuration of a K0_minimum value (K0_min) to be greater than zero; and
receive, after the configuration with K0_min, a second DCI message for scheduling a second PDSCH transmission to the wireless device, wherein the set of possible K0 values for the scheduling does not include K0=0.

9. The wireless device of claim 8, wherein the processor is further configured to cause the wireless device to:
maintain a discontinuous reception (DRX) inactivity timer for the RRC connection, wherein the time gap is based on a value of the DRX inactivity timer.

10. The wireless device of claim 9, wherein the processor is further configured to cause the wireless device to:
receive, from the cellular base station, an indication that the cellular base station will select a minimum time gap of at least one slot between providing a third DCI message scheduling a third PDSCH transmission and performing the third PDSCH transmission when the value of the DRX inactivity timer is greater than a predetermined threshold.

11. The wireless device of claim 9, wherein the processor is further configured to cause the wireless device to:
determine that the DRX inactivity timer for the RRC connection has expired;
transition to a connected-mode DRX (C-DRX) operation; and
receive a third DCI message scheduling a third PDSCH transmission to the wireless device during a C-DRX on duration, wherein a third time gap between providing the third DCI message scheduling the third PDSCH transmission and performing the third PDSCH transmission is based at least in part on the third DCI message being provided during the C-DRX on duration.

12. The wireless device of claim 11, wherein the third time gap is a minimum time gap of at least one slot.

13. The wireless device of claim 8, wherein the processor is further configured to cause the wireless device to:
operate in a narrower bandwidth after the configuration with K0_min than a bandwidth used prior to the configuration with K0_min.

14. An apparatus, comprising:
a processor configured to cause a wireless device to:
establish a radio resource control (RRC) connection with a cellular base station according to a first radio access technology (RAT);
receive, from the cellular base station, a first downlink control information (DCI) message scheduling a first physical downlink shared channel (PDSCH) transmission to the wireless device, wherein a time gap between receiving the first DCI and the first PDSCH transmission is given by a parameter K0, wherein K0 is indicated in the first DCI and a set of possible K0 values includes K0=0;
receive, from the cellular base station, configuration of a K0_minimum value (K0_min) to be greater than zero; and
receive, after the configuration with K0_min, a second DCI message for scheduling a second PDSCH transmission to the wireless device, wherein the set of possible K0 values for the scheduling does not include K0=0.

15. The apparatus of claim 14, wherein the processor is further configured to cause the wireless device to:
maintain a discontinuous reception (DRX) inactivity timer for the RRC connection, wherein the time gap is based on a value of the DRX inactivity timer.

16. The apparatus of claim 15, wherein the processor is further configured to cause the wireless device to:

receive, from the cellular base station, an indication that the cellular base station will select a minimum time gap of at least one slot between providing a third DCI message scheduling a third PDSCH transmission and performing the third PDSCH transmission when the value of the DRX inactivity timer is greater than a predetermined threshold.

17. The apparatus of claim 15, wherein the processor is further configured to cause the wireless device to:
   determine that the DRX inactivity timer for the RRC connection has expired;
   transition to a connected-mode DRX (C-DRX) operation; and
   receive a third DCI message scheduling a third PDSCH transmission to the wireless device during a C-DRX on duration, wherein a third time gap between providing the third DCI message scheduling the third PDSCH transmission and performing the third PDSCH transmission is based at least in part on the third DCI message being provided during the C-DRX on duration.

18. The apparatus of claim 17, wherein the third time gap is a minimum time gap of at least one slot.

19. The apparatus of claim 14, wherein the processor is further configured to cause the wireless device to:
   operate in a narrower bandwidth after the configuration with K0_min than a bandwidth used prior to the configuration with K0_min.

20. The apparatus of claim 14, wherein the processor is further configured to cause the wireless device to:
   implement dynamic bandwidth adaptation in response to the configuration with K0_min.

\* \* \* \* \*